Feb. 23, 1937. G. E. SHIPWAY 2,071,772
JOINT ASSEMBLY AND NAILING STRIP
Filed May 2, 1936
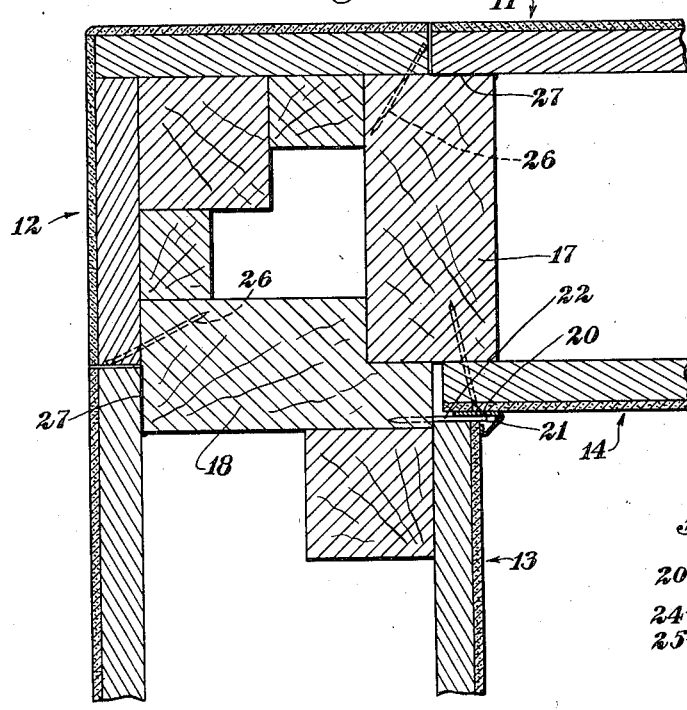
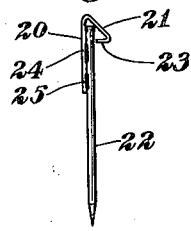
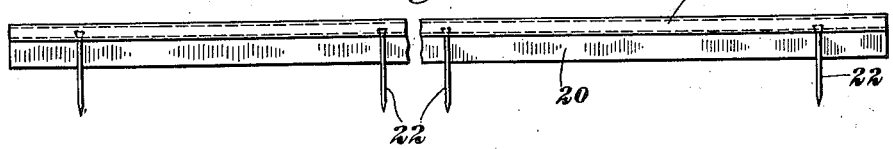
INVENTOR.
George E. Shipway.
BY D. N. Halstead.
ATTORNEY Patented Feb. 23, 1937

2,071,772

UNITED STATES PATENT OFFICE 2,071,772

JOINT ASSEMBLY AND NAILING STRIP

George E. Shipway, Noroton, Conn., assignor to Johns-Manville Corporation, New York, N. Y., a corporation of New York Application May 2, 1936, Serial No. 77,464

5 Claims. (Cl. 20—4)

This invention relates to a joint assembly in a building or the like and, particularly, to an improved nailing strip for closing the joint.

There have been made heretofore a number of nailing strips of various designs, including a strip of flexible metal and nails associated therewith for holding the strip over a joint that is to be closed. Ordinarily, these strips extend flatwise over the joint, with the nails lying in a plane approximately perpendicular to the plane of the broad surface of the strip.

When such strips are applied and the nails driven into a stud or other substructural member behind the joint, there is, ordinarily, flexing of the strip with consequent displacement of some of the nails from the planes in which the nails originally lie and approximately in which planes they should continue to lie during the nailing operation, if they are to penetrate properly into the said member.

It is an object of this invention to minimize the flexing of the nailing strip during the driving of the nails associated therewith and to stiffen the nails at some position distant from the heads thereof. Another object is to provide a member adapted to close tightly the joint between adjacent members such as panels and, particularly, to close a corner joint formed between panels extending at an angle to each other.

The invention comprises the novel features of the nailing strip and joint assembly hereinafter described or illustrated. In a preferred embodiment, the invention comprises a nailing strip having a relatively wide portion, adapted to extend continuously into the joint that is to be closed, nails secured rigidly to the wide portion, and a beaded portion continuous with the said wide portion and of width at least slightly greater than the width of the said joint. The invention comprises, also, the permanent and firm securing, as by welding, of nails, at their side portions to the said wide portion of the nailing strip, the nails being spaced from each other. The joint assembly comprised within the invention includes panels forming a joint therebetween and the nailing strip in position closing the joint, the spaced nails of the nailing strip being stiffened, on one side, by being secured rigidly to the said wide portion or flange of the nailing strip extending into the joint and, on the other side, by contact with the edge of one of the said panels.

A preferred embodiment of the invention is illustrated in the attached drawing and the invention will be described, for the purpose of exemplification, in connection therewith.

Fig. 1 shows a sectional plan view of a corner joint assembly and nailing strip made in accordance with the present invention.

Fig. 2 shows an end view of the nailing strip on a somewhat larger scale than that of Fig. 1.

Fig. 3 shows a longitudinal view of the nailing strip.

There is shown in Fig. 1 a wall assembly including panels 11 and 12 forming the outside of the wall and panels 13 and 14 forming, therebetween, a corner joint in front of nailable substructural members such as the wooden studs 17 and 18. (The term "nailable" means readily penetrable by a driven nail.) Suitably, these panels are constituted of a yieldable backing material, such as insulating fibreboard, and dense facing material, such, for example, as asbestos-cement board, adhered to the backing. The panels may be nailed to the substructural members as at 26 or adhered as at 27.

The nailing strip includes a wide portion 20 that extends into the joint, suitably, continuously and in contact with the edge portion of one of the panels.

To stiffen the nails and thus minimize the tendency to bending, particularly during the driving thereof, the nails 22 may be firmly and permanently secured at their sides to the wide portion 20 of the nailing strip. Preferably, the nailing strip is of formed steel or other rigid metal and the nails are welded each to the said portion at a plurality of points 24 and 25 or over a substantial length of the nail, so that a thorough stiffening effect is obtained.

Preferably, also, the nailing strip includes part 21, as illustrated, and a flange element 23 continuous with the part 21 and extending, from the side thereof towards and at approximately a right angle to the plane of the wide portion 20, this element 23 being adapted, in the assembled wall, to rest upon the panel 13.

In order that the connecting portion or bead 21 should be disposed symmetrically with respect to the panels 13 and 14, this portion may be flat over a substantial part of its area and be in a plane making an angle of approximately 45° with the plane of each of the members 20 and 23 as well as with the general plane of the nails 22 and the panels 13 and 14.

I have used to advantage a nailing strip in which the heads of the nails contact firmly with the inside of the bead portion of the strip, as shown in Fig. 2.

In driving home the nails of the nailing strip, there is used a suitable driving block and hammer, these accessories not being shown as they have form that would be readily obvious to one skilled in the art.

A further stiffening effect upon the nails is obtained, in the preferred embodiment of the invention, by the wedging of the nails between the edge of the panel 13 on one side and the wide portion 20 of the nailing strip on the other side of the nail.

Lengthwise of the nailing strip, the nails are spaced from each other, say, at a distance of the order of 6 inches or so.

The fact that the continuous part of the nailing strip has its wide portion extending in the direction of driving of the nails makes the strip resistant to flexing upon the application of the driving force.

The result of the combination of the several factors described, each reducing the likelihood of the nail being deflected from the proper direction before or during driving, makes possible the desired accuracy and firmness of nailing of the strip to the studs.

Also, there is tight closing of the joint and production of a pleasing appearance in the finished joint assembly.

It will be understood that the details given are for the purpose of illustration, not restriction, and that variations within the spirit of the invention are intended to be included in the scope of the appended claims.

What I claim is:

1. A nailing strip for closing the joint between the edge portions of two panels of finishing material forming, therebetween, a joint in front of a nailable substructural member, the said strip being substantially rigid, including a wide portion adapted to extend in edgewise manner into the said joint, and having spaced nails rigidly secured to the said wide portion, stiffened thereby, and adapted to be driven into the said member.

2. A nailing strip for closing the joint between the edge portions of two panels of finishing material forming, therebetween, a joint in front of a nailable substructural member, the said strip being substantially rigid, including a wide portion adapted to extend in edgewise manner into the said joint, having spaced nails rigidly secured to the said wide portion, stiffened thereby, and adapted to be driven into the said member, and including a beaded front portion of the strip, adapted to be exposed in the finished joint assembly, contacting at the inside with the heads of the said nails.

3. A nailing strip for closing the joint between the edge portions of two panels of finishing material forming, therebetween, a joint in front of a nailable substructural member, the said strip being substantially rigid, including spaced nails rigidly secured to the strip and adapted to be driven into the said member, and a beaded front portion of the strip adapted to be exposed in the joint assembly, the said beaded portion, over a substantial part of the total area thereof, being approximately flat and lying in a plane extending at an angle of about 45° to the general plane of the said nails.

4. A wall assembly including a nailable substructural member, panels of finishing material defining a joint therebetween and in front of the said member, and a nailing strip closing the said joint, the said strip being substantially rigid and including nails spaced at intervals along the strip, means securing the nails at the sides thereof to the said strip, and a wide portion of the said strip extending within the joint and continuously along one side thereof, the nails being wedged between the said portion on one side and the edge of a panel on the other side and driven into the substructural member, so that the nails are supported on two sides and the bending of the nails is thereby minimized.

5. A nailing strip for closing the joint between two panels of facing material extending at an angle of the order of 90° to each other and forming a corner joint therebetween, the strip including a portion extending into the said joint, a part extending at an angle of approximately 45° to the said portion, an element continuous with the said part and extending towards and at an angle of approximately 90° to the said portion, and means securing nails rigidly to the said portion.

GEORGE E. SHIPWAY.